United States Patent [19]

Welles, II et al.

[11] Patent Number: 4,796,236

[45] Date of Patent: Jan. 3, 1989

[54] ARCHITECTURE FOR ULTRASONIC IMAGING

[75] Inventors: Kenneth B. Welles, II, Schenectady; Sharbel E. Noujaim; Thomas L. Vogelsong, both of Clifton Park; Steven G. Karr, Scotia, all of N.Y.

[73] Assignee: General Electric Company, Schenectady, N.Y.

[21] Appl. No.: 947,065

[22] Filed: Dec. 29, 1986

[51] Int. Cl.⁴ .................................... G03B 42/06
[52] U.S. Cl. .............................. 367/7; 367/103; 367/105; 73/625; 128/661.01
[58] Field of Search ................. 367/7, 103, 105; 73/625; 128/660; 358/112

[56] References Cited

U.S. PATENT DOCUMENTS

| | | | |
|---|---|---|---|
| 4,154,113 | 5/1979 | Engeler | 128/660 |
| 4,237,737 | 12/1980 | Nitadori | 367/7 |
| 4,612,937 | 9/1986 | Miller | 128/660 |

Primary Examiner—Thomas H. Tarcza
Assistant Examiner—Daniel T. Pihulic
Attorney, Agent, or Firm—Lawrence D. Cutter; James C. Davis, Jr.; Marvin Snyder

[57] ABSTRACT

An ultrasonic imaging processing system includes transducers and means to generate in an analog fashion, in-phase and quadrature phase signals. These signals are converted to digital form and a butterfly phase rotator circuit is employed to correct for phase differences in beam steering and focusing. In particular, speed and simplicity is achieved through the utilization of read only memory means providing appropriate function values for phase correction in conjunction with digital multiplication and summing circuitry.

7 Claims, 2 Drawing Sheets

ARCHITECTURE FOR ULTRASONIC IMAGING

BACKGROUND OF THE INVENTION

The present invention is generally directed to a system for processing acoustic signals generated and received during the course of ultrasonic imaging. More particularly, the present invention is directed to a digital phase correction circuit which employs an architecture which is particularly suitable for use in ultrasonic imaging machines, particularly those employed in medical applications.

In the formation of images generated by ultrasound systems, it is necessary to be able to selectively view individual points within a body being imaged. Each such "point" actually comprises a small volume element whose dimensions depend upon the resolution of the overall system. However, various internal bodily structures exhibit collections of such points with different sonic absorption and reflection capabilities. It is these differences which are employed to generate the desired image. Nonetheless, it is necessary to be able to collect information about the sonic properties of these volume or pixel elements.

In a conventional ultrasonic imaging system, a linear array of transducers is provided. This array is typically fabricated in the form of a wand which is moved over the body of the patient by an ultrasonic imaging specialist. The transducers typically serve a dual function. Not only do they produce the ultrasonic wave fronts within the body, but they also operate to receive ultrasonic echo signals which emanate from various internal bodily structures which have been ultrasonically excited.

In a typical ultrasonic imaging device, an ultrasonic wave front is generated within the body being investigated. Subsequent to the excitation, a linear array of transducers receives echo signals from all of the points that have been excited. It is the object of the present invention to be able to electrically "orient the receiver" so as to be able to produce a signal which is proportional to the amplitude of the echo signal from a single reflection point (voxel or pixel) within the body. In this regard, it must be borne in mind that the signal from such a point travels different distances to the different transducers in the array. In so doing, this signal (from a single reflection point) is delayed by a time proportional to the distance between the point and a given transducer in the array. Naturally, this delay time is a function of the position of the transducer in the array and also a function of the position of the point. Of particular importance is the fact that the signals from a single reflection point arrive at the transducer array in such a manner as to exhibit phase differences arising from distance differences. These distance differences also produce time delay differences. Furthermore, because the ultrasonic echo signals must traverse different length paths and because there is a certain degree of attenuation which is generally proportional to the path length, the echo signals arriving at the various transducers also exhibit amplitude differences as a result of distance differences between the reflection point and the various transducers in the array. It is noted though that relative timing control as between various transducers in the array may be employed to gate all signals from a single reflection point through the transducer array at a single time. This effectively permits the array to "look at" a single observation point. Additional timing control permits the transducer array to be "focused" at an observation point which is a certain distance from the array, as determined by additional timing control. Naturally, the transducer array receives signals from other excited points at the same time. Nonetheless, it is possible to form the summation of the signals from a transducer array steered to and focused upon a single point so that, on the average, the signal from that point dominates signals from all other points in the view plane. Ultrasonic imaging systems typically provide beam steering and focusing by generating phasing, time slipping and time delay corrections for the received signals. Phasing is generally generated by providing approximately 128 differently phased clock signals to 64 receivers. Time delay is provided by use of variable length delay lines. Some systems also provide time slipping by digitizing the signal at a frequency of 20 megahertz and using the sample closest to the desired time. In this fashion, an ultrasonic beam is steered and focused. Nonetheless, the problem of phase differences still exist.

It should be noted that digital phase correction becomes more and more necessary at higher operating frequencies for ultrasonic transducers. For example, suppose that a phase quantization of one part in thirty-two at an operating frequency of ten megahertz is required. An analog phase slip in the mixers would require a 3 nanosecond time resolution. This is difficult, if not impossible, and even if possible, would be so only at great expense which would probably be prohibitively high. With the digital phase correction of the present invention, however, this is not a problem and the desired 1/32 phase correction is readily achieved.

While current ultrasonic imaging systems are easy to use and have been found to be extremely beneficial in medical diagnostic applications, it is still nonetheless desirable to be able to reduce the cost and size of such systems so as to make them even more available and more effective as diagnostic tools. In particular, it is desirable to be able to employ very large scale integrated circuit methods and architectures in the structuring of ultrasonic imaging systems. Such systems would alleviate the need for employing a large number of discrete electronic components disposed on a relatively large circuit board and requiring interconnection of the discrete electronic components.

SUMMARY OF THE INVENTION

In accordance with a preferred embodiment of the present invention, analog components receive and preamplify acoustic components of an ultrasonic echo signal. These signals are mixed with a single local, in-phase (LOI) and a single local quadrature phase (LOQ) oscillators with the mixer output signals each being filtered by a low pass filter to generate I and Q signals. The I and Q analog signals are then converted to digital signals using a variably timed conversion pulse to generate element-to-element time slippage, thereby introducing time slip required by steering and focus. In particular reference to the present invention, the digitized I and Q signals are multiplied by sines and cosines of specific angles to correct for phase differences required by steering and focus. Specific cosine and sine multiplications and additions (more particularly described below) are performed resulting in I' and Q' signals which are placed in variable length digital shift registers to correct for time delay incurred by steering and focusing. At the output of the shift register for each element, the I' and Q' signals are summed to create I total and Q total signals which represent echo information from a single observation point. While I total and Q total contains information from other points, such information has been selectively attenuated by the focusing and summing process.

More particularly, an apparatus for ultrasonic imaging in accordance with the present invention comprises a plurality of ultrasonic signal transducers for receiving ultrasonic signals and for generating electrical signals in response to received ultrasonic echoes. A plurality of signal processing elements receives signals from at least one ultrasonic transducer associated with the processing element which in turn operates to produce digitized and phase corrected in-phase and quadrature phase signals each of which are independently summed from each signal processing element.

Each such signal processing element includes means for producing an in-phase and a quadrature phase signal from signals from at least one associated transducer. Means are provided for converting said in-phase and said quadrature phase signals to digital form. This conversion is coordinated in time with respect to conversion means in other signal processing elements to as to substantially simultaneously convert signals arriving at the ultrasonic transducers from a single observation point. Most importantly, for the present invention, means are provided for digitally adjusting the converted in-phase and quadrature phase signals to correct for phase differences along distinct ultrasonic signal paths from the observation point to the associated transducer. A pair of variable length delay shift registers are provided so as to synchronize signals from distinct signal processing elements. Even more particularly, the phase adjusting means of the present invention preferably comprises a trigonometric function generation means and "butterfly phase rotator".

Accordingly, it is an object of the present of the invention to provide a processing apparatus for use in ultrasonic imaging systems.

It is also an object of the present invention to provide a circuit architecture for ultrasonic imaging which is readily capable of taking advantage of very large scale integrated circuit design techniques and methodologies.

It is also an object of the present invention to provide smaller and less costly ultrasonic imaging systems.

It is a still further object of the present invention to correct phase differences arising in ultrasonic imaging systems.

It is also an object of the present invention to simplify the manufacture of ultrasonic imaging systems.

Lastly, but not limited hereto, it is an object of the present invention to reduce the complexity of ultrasonic imaging systems and at the same time to provide improved images.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
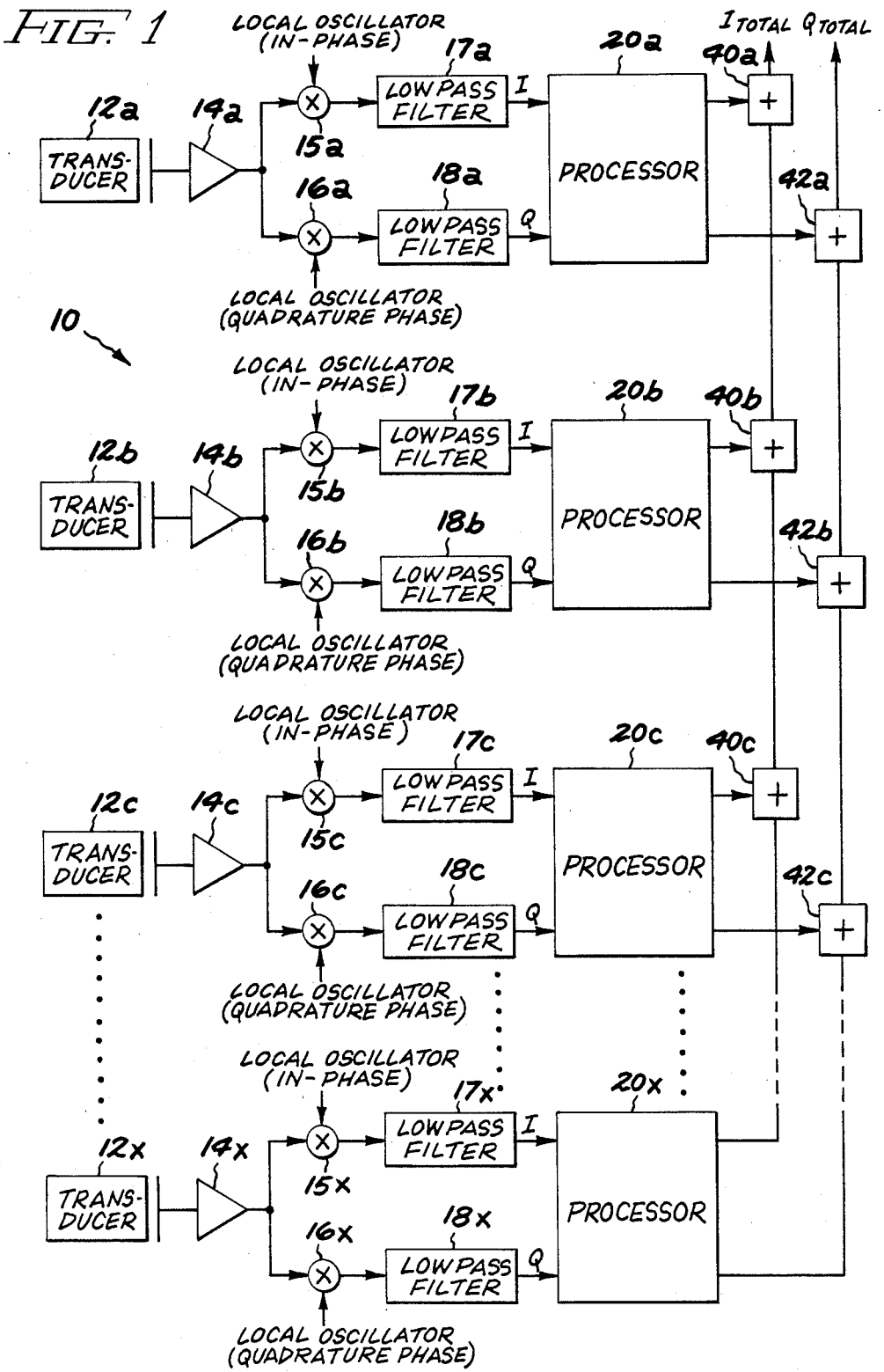
FIG. 1 is a schematic view illustrating the overall structure of the present invention and in particular, illustrating an array of transducers, each of which is connected to a single signal processing element, each of which in turn provides signals to two summers.
Figure 2:
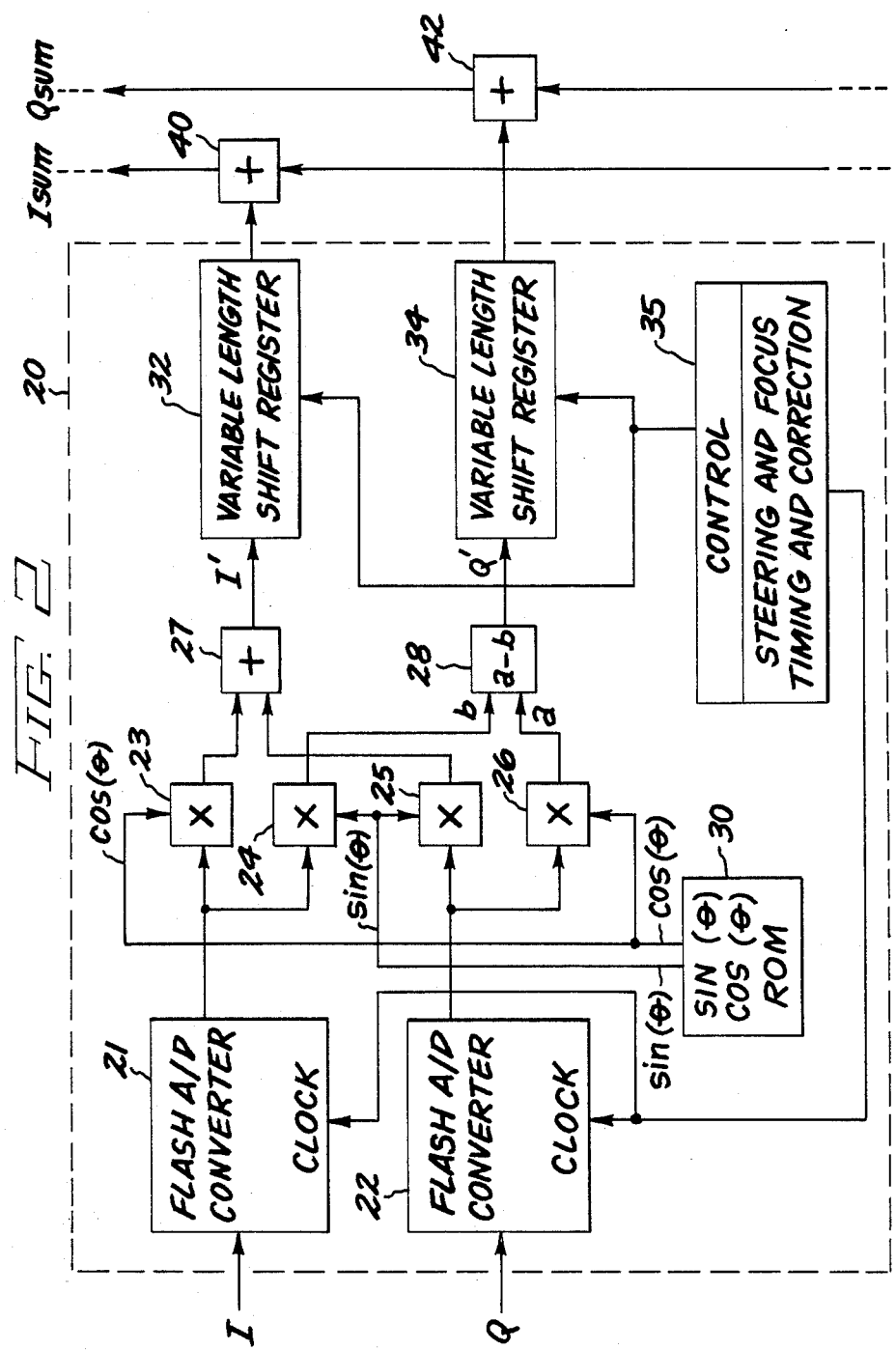
FIG. 2 is schematic view of a processor such as is contained in each signal processing element from FIG. 1.

FIG. 1 illustrates a preferred embodiment of a signal processing system 10 in accordance with the present invention. More particularly, FIG. 1 illustrates the inclusion of transducers 12a, 12b, 12c, . . . , 12x. Each of these ultrasonic transducers supplies an electrical signal to preamplifiers 14a, 14b, 14c, . . . , 14x, respectively, as shown. Preamplifiers are preferably provided to enhance the signals produced by the transducers. For purposes of understanding the present invention, it is only necessary to consider the role of the transducer as receiver, rather than a generator of ultrasonic signals. In particular, the transducers produce an electrical signal in response to ultrasonic echoes produced by internal structures of the body being investigated. These electrical signals are preferably amplified and used to create analog in-phase signals I and quadrature phase signals Q. Such I and Q signals are generally produced for each transducer. For example, an in-phase signal I may be produced from an electrical signal provided by transducer 12a by multiplying the mixing signal via analog multiplier 15a with a signal provided by a local in-phase oscillator (LOI). A typical local oscillator produces a sinusoidal waveform. The multiplied signal is then supplied to low pass filter 17a which produces the desired in-phase signal, I. This signal is supplied to processor 20a, more particularly described below in reference to FIG. 2. In a similar manner, the same electrical signal from transducer 12a is multiplied by a local quadrature phase oscillator (LOQ) multiplier 16a. This signal is them supplied to low pass filter 18a which produces the desired quadrature phase signal Q which is supplied to processor 20a. The local quadrature phase oscillator signal is typically cosinusoidal, that is, similar to the in-phase oscillator signal except shifted by 90 degrees in phase. It is also noted that only one LOI and one LOQ need be employed in the system shown in FIG. 1. Multiple oscillators are shown only for drawing convenience and it is not to be implied that a plurality of separate oscillators are needed.

Typically, the local oscillators operate at a frequency of from about 2.5 to about 10 megahertz. Likewise, the low pass filters typically exhibit a cutoff frequency between approximately 1 and 5 megahertz.

Processor 20a for example, receives in-phase and quadrature phase signals I and Q and produces an in-phase output and a quadrature phase output. Collectively, processor 20a, low pass filter 17a, low pass filter 18a, multipliers 15a and 16a and the local in-phase and quadrature phase oscillators are referred to herein, and in the appended claims for convenience, as a "signal processing element". Each transducer is typically associated with its own signal processing element. Each signal processing element produces a pair of output signals. One of the output signals represents a component of the total in-phase signal and is supplied to an appropriate summer. These summers are designated in FIG. 1 by reference numerals 40a, 40b, 40c, . . . , etc. The number of transducers and signal processing elements is typically either 64 or 128 although larger and smaller arrays may be employed depending on the application. In a similar fashion, quadrature phase components from processors 20a, 20b, 20c, . . . , 20x are supplied to summers 42a, 42b, 42c, etc., respectively. It is the summation carried out in summers 40 and 42 (referring to them collectively) which permits selection of a single observation point by adding together a plurality of signals all of which are "focused" on that point. In this way, the signal from the desired observation point is made to dominate other signals which may also be present at the transducers. In a sense then, the summers provide a selective amplification of the deired signal. By causing the focus of the transducer array to vary within a plane, it is thus possible to produce images of internal bodily structures based upon their ultrasonic reflectivity properties.

With particular reference to the labeling in FIG. 1, it is noted that the components coupled to transducer 12b are provided with the same numeric designation as the components connected to transducer 12a. However, these latter reference numerals are qualified with the letter suffix designation "b" to indicate their association with transducer 12b. It is thus seen that the structure illustrated in FIG. 1 is a repetitive structure. It is repetitive structures that are particularly amenable to fabrication by VLSI methods.

It is thus seen that FIG. 1 illustrates a plurality of ultrasonic transducers for receiving ultrasonic signals. These transducers are each connected to a signal processing element which produces corrected digitized in-phase and quadrature phase signals and supplies these signals to summing means 40 and 42. It is particularly noted that the in-phase and quadrature phase signals are summed separately and that the signals may then be supplied to the display processing portion of an ultrasonic imaging system. In this regard, it is particularly noted then that the present invention is more particularly describable as a "front end" for an ultrasonic image generation system.

Attention is now specifically directed to processor elements 20a, 20b, 20c, . . . , 20x as shown is FIG. 1. These processor elements are typified by the block diagram shown in FIG. 2 wherein processor 20 is shown in more complete detail. In particular, processor 20 representing any of the processors shown in FIG. 1, receives in-phase and quadrature phase signals I and Q from their corresponding low pass filters. Analog-to-digital converter 21 converts a received in-phase signal to digital form under control of functional block 35 and supplies a digitized result to multipliers 23 and 24. Likewise, analog-to-digital converter 22 operates to convert quadrature phase signal Q to digitized form under the timing control of functional block 35. The I and Q signals are supplied to converters 21 and 22 where they are digitized substantially simultaneously. The angle of steering and the focal length of the beam being received is used to generate a time slip in the triggering of the A/D converters. This time slip is an amount of time which is a fraction of the interval between samples. This provides that the same signal from the imaged object is sampled at all different transducer elements. In a similar manner, the digitized quadrature phase signal is supplied to multipliers 25 and 26. Multipliers 23, 24, 25 and 26 are digital multipliers which also receive signals from trigonometric function generating means 30. Trigonometric function generating means 30 preferably comprises a read only memory (ROM) containing the values of sine and cosine function arguments for various angles. The angle selected is determined by control block 35 based upon steering, focus and timing requirements dictated by the location of the transducer associated with the particular processor and also based upon the position of the observation point presently being observed. A sine function output from trigonometric function generating 30 is supplied to multipliers 24 and 25. Likewise, a cosine function output, in digital form, is supplied to multipliers 23 and 26. The resulting digital outputs from multipliers 23 and 25 are summed in adder 27 to produce digital signal I'. In a similar fashion, subtractor 28, performing the subtraction a−b as shown, receives a signal from multiplier 24 and another signal from multiplier 26. It is noted that the subtractor is preferably implemented as an adder with an arithmetic inverter at the "b" input. The difference produced results in the digital signal Q'. Multipliers 23, 24, 25 and 26, memory means 30 and summers 27 and 28 are collectively referred to herein as a digital butterfly phase rotator. It is this circuitry in particular which corrects for phase errors arising out of ultrasonic path length differences. In particular, this circuitry results in the formation of I' and Q' signals as specified by the following two equations.

$$I' = I*COS(THETA)Q*SIN(THETA) \quad (1)$$

$$Q' = Q*COS(THETA) - I*SIN(THETA) \quad (2)$$

In one embodiment of the invention, memory means 30 comprises a read only memory which contains only eight different values, each specified to an accuracy of eight bits. These eight values actually allow for the incorporation of 32 different values of $\theta$ from 0 degrees to 360 degrees. The value of $\theta$ is determined by the calculation of the steering angle and the focal length to the beam being received. By providing coordinated values of $\theta$ (that is, THETA) for each transducer and signal processing element, the I' and Q' signals for all elements becomes coherent.

The digitized I' and Q' signals are now supplied to variable length shift registers 32 and 34, respectively, as shown in FIG. 1. This provides a delay of an integral number of samples from when the data is acquired to when the data is available at the output. The number of delay stages is chosen by control function block 35 in accordance with the particular steering angle and focal length presently being observed, so that the output of all shift registers from all elements will substantially simultaneously provide the I' and Q' signals corresponding to a particular reflective object in the ultrasonic beam. In particular, processor 20 may be implemented on individual CMOS chips which are connected to each other in such a fashion as to sum all of the I' and Q' values in each sample and to provide a final I total and Q total value. These values provide the data which is then used for imaging the object scanned by the ultrasonic beam.

From the above it is seen then that the architecture of the present invention permits the utilization of repetitive structures which are easily implemented in VLSI circuitry. More particularly, it is seen that the present invention provides a rapid and economical circuit for the correction of phase differences which inherently arise in ultrasonic imaging systems. It is further seen that the circuitry employed is standard, but yet is configured in such a way as to provide rapid parallel information processing, reduction of circuit complexity and reduced fabrication costs.

While the invention has been described in detail herein in accord with certain preferred embodiments thereof, many modifications and changes may be effected by those skilled in the art. Accordingly, it is intended by the appended claims to cover all such modifications and changes as fall within the true spirit and scope of the invention.

The invention claimed is:

1. An apparatus for ultrasonic image processing, said apparatus comprising:
   a plurality of ultrasonic signal transducer means for receiving ultrasonic signals and generating electrical signals in response to said ultrasonic signals;
   a plurality of signal processing elements receiving said electrical signals from at least one ultrasonic transducer associated therewith, each said signal processing element including:
      means for producing an in-phase and a quadrature-phase signal from said signals from at least one of said associated transducers;
      means for converting said in-phase and said quadrature-phase signals to digital form, said conversion being coordinated in time with respect to conversion means in other signal processing elements so as to substantially simultaneously convert signals arriving at said ultrasonic transducers from a single reflection point;
      means for digitally adjusting said converted in-phase and quadrature-phase signals to correct for phase differences along distinct ultrasonic signal paths from said reflection point to said associated transducer; and
      a pair of variable length delay means for receiving said adjusted in-phase and quadrature-phase signals respectively, said delay being selectable so as to synchronize signals from distinct ultrasonic transducers;
   means for summing said in-phase signals from said variable length delay means; and
   means for summing said quadrature-phase signals from said variable length delay means.

2. The apparatus of claim 1 in which said means for producing in-phase signals comprises:
   means for multiplying the signal from an associated transducer by a local in-phase oscillator signal; and
   low pass filter means receiving said signal from said multiplying means.

3. The apparatus of claim 1 in which said means for producing quadrature phase signals comprises:
   means for multiplying the signal from an associated transducer by a local quadrature phase oscillator signal; and
   low pass filter means receiving said signal from said multiplying means.

4. The apparatus of claim 1 in which said converting means comprises a pair of flash analog-to-digital converters.

5. The apparatus of claim 1 in which said means for adjusting said converted in-phase and quadrature phase signals comprises:
   means for generating digital representations of sines and cosines of a fixed set of angles, said angles being selectable in accordance with the position of the transducer with which the signal processing element is associated and in accordance with the position of said observation point;
   means for digitally multiplying each of said converted in-phase and quadrature phase signals by sine and cosine signals so as to produce a cosine multiplied in-phase signal, a cosine multiplied quadrature phase signal, a sine multiplied in-phase signal and a sine multiplied quadrature phase signal;
   means for digitally forming the sum of said cosine multiplied in-phase signal and said sine multiplied quadrature phase signal, whereby an I' signal is generated; and
   means for digitally subtracting said sine multiplied in-phase signal from said cosine multiplied quadrature phase signal, whereby a Q' signal is generated.

6. The apparatus of claim 5 in which said generating means comprises read only memory.

7. The apparatus of claim 1 further including signal preamplification means electrically disposed between said transducers and said signal processing elements.

* * * * *